Figure 1:
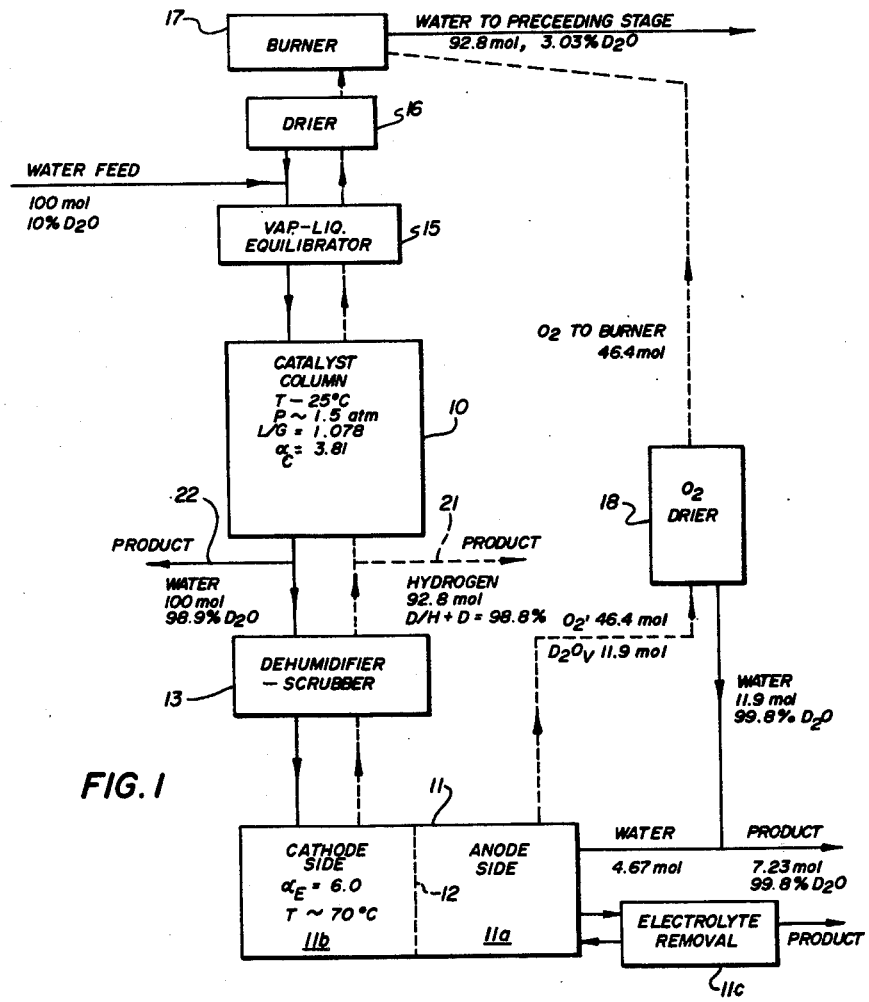

United States Patent [19]

Hammerli et al.

[11] 4,191,626
[45] Mar. 4, 1980

[54] APPARATUS FOR FINISHING AND UPGRADING OF HEAVY WATER

[75] Inventors: Martin Hammerli; John P. Butler, both of Deep River, Canada

[73] Assignee: Atomic Energy of Canada Limited, Ottawa, Canada

[21] Appl. No.: 908,226

[22] Filed: May 22, 1978

[51] Int. Cl.$^2$ .................. C25B 1/10; C25B 15/08; C01G 57/00; C01B 4/00

[52] U.S. Cl. .................. 204/266; 204/101; 204/129; 423/249; 423/648 A; 423/580

[58] Field of Search ............ 423/648 A, 580 H, 249; 204/129, 101, 266, 237, 263

[56] References Cited

U.S. PATENT DOCUMENTS

| Re. 26,913 | 6/1970 | Lewis et al. | 204/101 |
| 3,113,080 | 12/1963 | Andrus | 204/129 X |
| 4,025,560 | 5/1977 | Rolston et al. | 423/648 A |

FOREIGN PATENT DOCUMENTS

| 1593961 | 7/1970 | France | 423/580 H |
| 803274 | 10/1958 | United Kingdom | 423/580 H |
| 973820 | 10/1964 | United Kingdom | 204/129 |

Primary Examiner—John H. Mack
Assistant Examiner—D. R. Valentine
Attorney, Agent, or Firm—J. R. Hughes

[57] ABSTRACT

Apparatus for upgrading and final enrichment of heavy water comprising means for contacting partially enriched heavy water feed in a catalyst column with hydrogen gas (essentially $D_2$) originating in an electrolysis cell so as to enrich the feed water with deuterium extracted from the electrolytic hydrogen gas and means for passing the deuterium enriched water to the electrolysis cell.

7 Claims, 2 Drawing Figures

APPARATUS FOR FINISHING AND UPGRADING OF HEAVY WATER

This invention relates to apparatus and method involving a combined electrolysis catalytic exchange process for heavy water, $D_2O$ upgrading and final enrichment.

At the present time heavy water is produced primarily by one or more stages of the Girdler-Sulphide (GS) process which enriches water in the range of 5–30% $D_2O$ concentration followed by final enrichment by water distillation processes or by cascaded electrolysis systems. These final stages raise the $D_2O$ concentration to about 99.8%.

It is an object of the present invention to provide a process and apparatus for deuterium enrichment as a final stage in a heavy water plant.

It is another object of the invention to provide a process and apparatus for continuous on-line enrichment of the heavy water in moderator and heat transfer systems in heavy water nuclear reactors to maintain the deuterium concentration at greater than 99.8%.

It is another object of the invention to provide a process and apparatus for enrichment of heavy water, that has been downgraded with natural water (to typically 20–40% $D_2O$) during the course of operating a heavy water nuclear reactor, and to produce a heavy water product with a deuterium concentration of about 99.8%. This process is referred to as upgrading hereafter.

These and other objects of the invention are achieved by a method comprising contacting partially enriched heavy water feed in a catalyst column with hydrogen gas (essentially $D_2$) originating in an electrolysis cell so as to enrich the feed water with deuterium extracted from the electrolytic hydrogen gas and passing the deuterium enriched water to the electrolysis cell.

The objects of the invention are also achieved by apparatus for enriching and upgrading heavy water comprising a catalyst isotope exchange column with hydrogen gas and liquid water passing therethrough in countercurrent isotope exchange relationship, an electrolysis cell having an anode side and a cathode side and a separator therebetween, a dehumidifier-scrubber, means for passing the liquid water enriched in deuterium from the catalyst column through the dehumidifier-scrubber to the electrolysis cell, means for passing the hydrogen gas evolved in the cathode side of the cell through the dehumidifier-scrubber to the catalyst column, said dehumidifier-scrubber adapted to adjust the humidity of the deuterium gas to the conditions prevailing in the catalyst columns, to bring the deuterium concentration of the water vapour in the gas stream in isotopic equilibrium with the liquid water from the enricher, and to transfer any entrained electrolyte in the deuterium gas to the down-flowing water stream, means for passing the hydrogen gas from the catalyst column to an output, means for introducing an input water feed to the upper portion of the catalyst column, and means for taking a product enriched in deuterium from the system. The preferred arrangement further comprises a gas drier to remove the water, means for returning a portion of this water to the cell and means for taking the remaining portion as a deuterium product output, means for sending the dried oxygen to a burner, and a burner for recombining the hydrogen and oxygen to produce deuterium depleted water. For purposes of upgrading, the system further comprises a stripper containing a catalyst positioned between the enricher column and the burner which promotes isotopic exchange between hydrogen gas and liquid water to further reduce the deuterium content of the depleted hydrogen. In the upgrading application a portion of the deuterium depleted water stream from the burner is used as feed water to the stripper and the remaining portion goes to waste.

Figure 2:
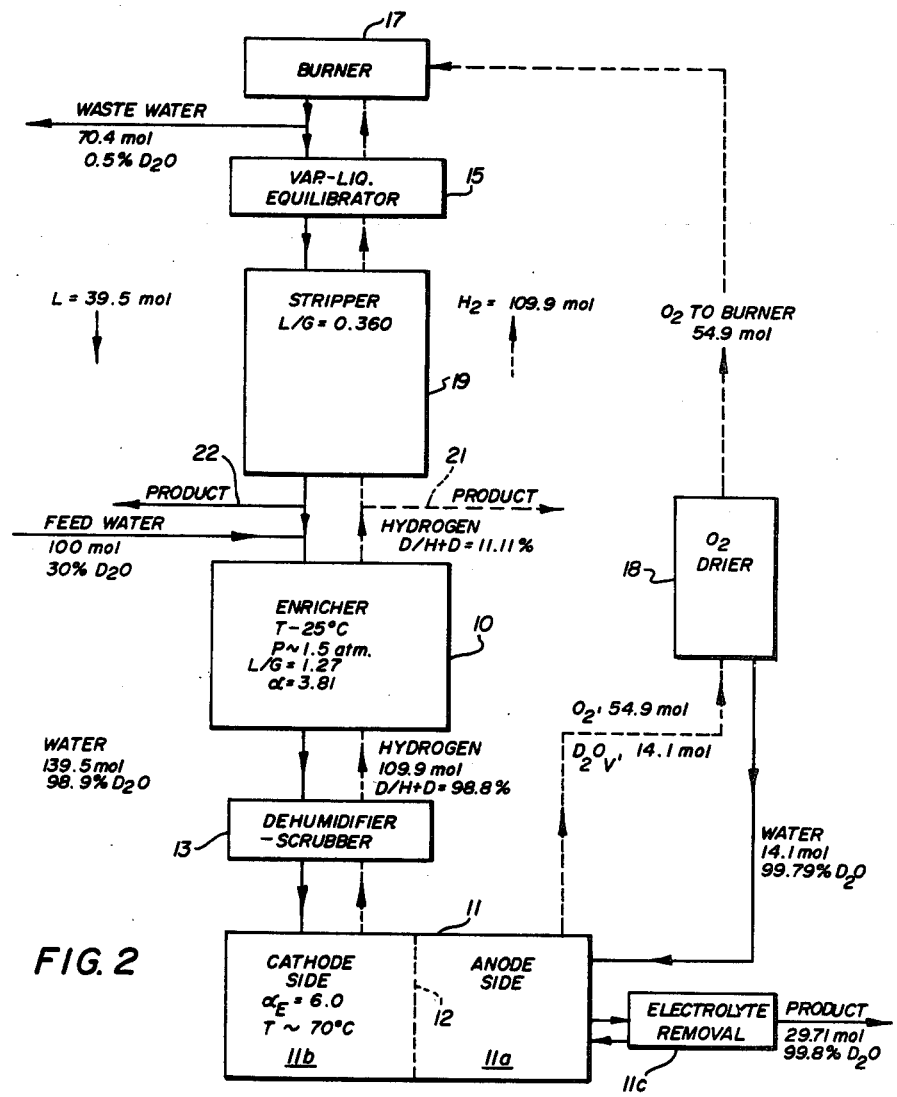

In drawings which illustrate embodiments of the invention,

FIG. 1 is a flow diagram of the process for use as the final enrichment stage at a $D_2O$ plant, and FIG. 2 is a flow diagram of the process for upgrading the heavy water in a nuclear reactor.

The drawings indicate examples of the important parameters of the processes as follows:

(a) liquid and gas flow rates in mols
(b) $D_2O$ concentrations as percentages
(c) liquid/gas molar flow rates (L/G) as a ratio
(d) Temperature (T) in °C.
(e) pressure (P) in atmospheres (atm)
(f) catalyst separation factor ($\alpha_c$) as a ratio
(g) electrolysis separation factor ($\alpha_E$) as a ratio It should be pointed out that the specific concentrations and molar flows given in the figures are by way of example only and can be varied according to design considerations.

Referring to FIG. 1, the chief elements of the apparatus are an enricher 10 and an electrolyser 11. The enricher is an exchange column containing a packed catalyst bed in which hydrogen gas and liquid water pass in countercurrent isotope exchange relationship. The catalyst must be wet-proofed, hydrophobic and of course active in the presence of liquid water. The preferred catalyst material is a Group VIII metal having a liquid-water-repellent organic polymer or resin coating thereon selected from the group consisting of polyfluorocarbons, hydrophobic hydrocarbon polymers of medium to high molecular weight, and silicones, and which is permeable to water vapor and hydrogen gas. These types of catalyst are described in U.S. Pat. No. 3,981,976 issued Sept. 21, 1976, and in copending U.S. application Ser. No. 733,417 filed Oct. 18, 1976, now U.S. Pat. No. 4,126,687. Preferable types of catalysts are also described in a paper entitled "Novel Catalysts for Isotope Exchange between Hydrogen and Liquid Water" published in the ACS Symposium Series No. 68, of the American Chemical Society.

The electrolyser 11 is any type of electrolysis cell incorporating a separator 12 between the anode compartment 11a and the cathode compartment 11b. For economic reasons, it is preferable that the cell used has a low water and/or electrolyte inventory.

The electrolytic hydrogen produced in the electrolytic cell which is depleted in deuterium relative to the electrolyte by virtue of the kinetic isotope effect inherent in the hydrogen evolution reaction, passes upwards (dotted lines) through a dehumidifier-scrubber 13 and through the catalyst column 10 where it steadily loses most of its remaining deuterium as it moves up the column in countercurrent flow with an input water feed (solid lines) introduced above the column and trickling down through the column, through the dehumidifier-scrubber to the electrolysis cell. The dehumidifier-scrubber adjust the humidity of the deuterium gas to the conditions prevailing in the catalyst columns, to bring the deuterium concentration of the water vapour in the gas stream in isotopic equilibrium with the liquid water from the enricher, and to transfer any entrained electrolyte in the deuterium gas to the down-flowing water stream. The hydrogen gas after passing through the catalyst column passes to vapor-liquid equilibrator 15 which serves to bring the deuterium concentration of the water vapor in the gas stream in isotopic equilibrium with liquid water input (e.g. 100 mol., having a $D_2O$ concentration of 10%). The hydrogen gas from the vapor-liquid equilibrator passes to drier 16 which serves to remove water vapor in the hydrogen since the atom fraction, $D/(H+D)$ is higher than the hydrogen and then to the burner 17 where it is burned (recombined with oxygen) to produce a water output that is returned to a preceding stage of the overall heavy water plant. Water from drier 16 is combined with the input feed water and returned to the vapor-liquid equilibrator.

The oxygen gas, $O_2$ and water vapor $H_2O_V$, from the anode side of the electrolysis cell 11 is passed to drier 18 that removes the water and the heavily deuterated liquid water is returned to the cell. A fractional output is taken as product. The drier could be for example a condenser involving a packed column, molecular sieve, etc. The oxygen output, $O_2$, may be used in the conversion of the hydrogen output to water.

In FIG. 1, the product is withdrawn from the water vapor removed from the oxygen. It could also be withdrawn from the electrolyte after removal of the electrolyte material such as KOH, or the liquid water from the bottom of the exchange column. If the latter is done, however, more enrichment is required in the catalyst exchange column.

FIG. 2 shows the process as adapted for upgrading heavy water e.g. from a heavy water nuclear reactor. The example shown is for a 30% $D_2O$ feed. Other concentrations could equally well be accommodated. For example, a 10% feed would be applied at an intermediate point in the stripper column 19 and similarly a 60% $D_2O$ feed could be fed into the catalyst column 10. The system is essentially the same as described in FIG. 1, but there are some differences. No drier is needed before the burner because the hydrogen and the water vapor have approximately the same deuterium concentration. The stripper column is required when it is not convenient to feed the hydrogen at 11% deuterium or the water produced from this hydrogen back to a heavy water plant. The stripper column is also required if the heavy water feed to the plant contains tritium since environmental considerations may not permit tritiated water to be added to a heavy water plant. The L/G ratio in the stripper will be in the range of about 0.3 to 0.8 the specific value depending primarily on the chosen ratio of the deuterium concentrations of the hydrogen at the top of the enricher and the water feed. In the example chosen, the L/G ratio in the stripper is 0.36. Because a stripper column is required, the downgraded heavy water feed (about 30% $D_2O$) must be electrolysed more than once and in the example shown it is about 1.1.

In the above description of the FIG. 1 version of the apparatus, the enriched product is shown as taken from the liquid returning from the oxygen drier 18. Alternatively an output could be taken from the cell 11 and this would probably require an electrolyte removal device 11c. Output product could also be taken from the hydrogen gas stream (line 21) or the water stream (line 22). These output possibilities are also shown in FIG. 2.

We claim:
1. Apparatus for enriching and upgrading heavy water comprising:
   (a) a catalyst isotope exchange column enricher with means for passing hydrogen gas and liquid water therethrough in counter-current isotope exchange relationship,
   (b) an electrolysis cell having an anode side and a cathode side and a separator therebetween,
   (c) a dehumidifier-scrubber,
   (d) means for passing the liquid water enriched in deuterium from the catalyst column through the dehumidifier-scrubber to the electrolysis cell,
   (e) means for passing the hydrogen gas evolved in the cathode side of the cell through the dehumidifier scrubber to the catalyst column, said dehumidifier-scrubber adapted to adjust the humidity of the depleted hydrogen gas to the conditions prevailing in the enricher, to bring the deuterium concentration of the water vapor in the gas stream in isotopic equilibrium with the liquid water from the enricher, and to transfer any entrained electrolyte in the hydrogen gas to the downflowing water stream,
   (f) means for passing the hydrogen gas from the catalyst column to an output,
   (g) means for introducing an input water feed containing a minor proportion of heavy water to the upper portion of the catalyst column,
   (i) means for taking the oxygen gas evolved in the anode side of the electrolysis cell and highly deuterated water vapor from the cell and passing it through the gas drier to remove the water,
   (j) means for returning this water to the cell,
   (k) a burner for recombining the output hydrogen and oxygen,
   (l) means for passing the dried oxygen gas to the burner, and
   (m) means for taking a product enriched in deuterium from the system.

2. Apparatus as in claim 1 wherein the means for taking a product enriched in deuterium is means for taking a proportion of the water from the oxygen gas drier.

3. Apparatus as in claim 1 wherein the means for taking a product enriched in deuterium is means for taking a product from the anode side of the cell.

4. Apparatus as in claim 1 wherein the means for taking a product enriched in deuterium is means for taking a proportion of the hydrogen gas stream flowing upward in the system.

5. Apparatus as in claim 1 wherein the means for taking a product enriched in deuterium is means for taking a proportion of the liquid water stream flowing downward in the system.

6. Apparatus for upgrading heavy water as in claim 1 further comprising a stripper containing a catalyst positioned between the burner and the enricher to further reduce the deuterium content in the gas stream and transfer deuterium to the countercurrent liquid water stream.

7. Apparatus as in claim 1 further comprising a vapor-liquid equilibrator positioned between the enricher and burner for bringing the deuterium concentration of water vapor in the gas stream into isotopic equilibrium with liquid water from the input feed or the burner.

* * * * *